United States Patent

Hosono

(10) Patent No.: US 8,971,879 B2
(45) Date of Patent: Mar. 3, 2015

(54) MOBILE COMMUNICATION METHOD AND NETWORK APPARATUS

(75) Inventor: Hiroyuki Hosono, Yokohama (JP)

(73) Assignee: NTT DOCOMO, INC., Tokyo (JP)

(*) Notice: Subject to any disclaimer, the term of this patent is extended or adjusted under 35 U.S.C. 154(b) by 576 days.

(21) Appl. No.: 12/996,479

(22) PCT Filed: Jun. 5, 2009

(86) PCT No.: PCT/JP2009/060389
§ 371 (c)(1),
(2), (4) Date: Jan. 20, 2011

(87) PCT Pub. No.: WO2009/148166
PCT Pub. Date: Dec. 10, 2009

(65) Prior Publication Data
US 2011/0117906 A1 May 19, 2011

(30) Foreign Application Priority Data
Jun. 6, 2008 (JP) ................................. 2008-149973

(51) Int. Cl.
*H04W 4/00* (2009.01)
*H04W 48/06* (2009.01)
(Continued)

(52) U.S. Cl.
CPC .............. *H04W 48/06* (2013.01); *H04W 84/16* (2013.01); *H04W 84/12* (2013.01)
USPC ........... 455/434; 370/332; 370/329; 455/418; 455/422.1; 455/436; 455/450; 455/456.1

(58) Field of Classification Search
CPC ....... H04W 84/12; H04W 4/08; H04W 48/16; H04W 84/045; H04W 88/08; H04W 8/186
USPC ............... 370/332, 329; 455/418, 422.1, 434, 455/436, 450, 456.1
See application file for complete search history.

(56) References Cited

U.S. PATENT DOCUMENTS 7,190,952 B2 * 3/2007 Okita et al. ................... 455/418
8,423,033 B1 * 4/2013 Everson et al. ............... 455/450
(Continued)

FOREIGN PATENT DOCUMENTS

JP 7 303280 11/1995
JP 2006 60322 3/2006
(Continued)

OTHER PUBLICATIONS

"Requirements for LTE Home eNodeBs," 3GPP TSG RAN #35 RP-070209, total 4 pages, (2007).
(Continued)

*Primary Examiner* — Charles Appiah
*Assistant Examiner* — Jaime Holliday
(74) *Attorney, Agent, or Firm* — Oblon, Spivak, McClelland, Maier & Neustadt, L.L.P.

(57) ABSTRACT

A mobile communication method comprises a step in which a first radio base station, finds another radio base station provided in a particular user network when provided in the particular user network; a step in which the first radio base station and the other radio base station found thereby constitutes a group; a step in which a number of mobile stations that can be connected to the group at the same time is decided; and a step in which the number of mobile stations connected at the same time to the first radio base station and other radio base station belonging to the group is restricted based on the decided number of mobile stations that can be connected at the same time.

10 Claims, 3 Drawing Sheets

(51) Int. Cl.
*H04W 84/16* (2009.01)
*H04W 84/12* (2009.01)

(56) References Cited

U.S. PATENT DOCUMENTS

| | | | |
|---|---|---|---|
| 2004/0199616 A1* | 10/2004 | Karhu | 709/221 |
| 2006/0040663 A1 | 2/2006 | Ise et al. | |
| 2006/0073791 A1* | 4/2006 | Senarath et al. | 455/67.13 |
| 2008/0267153 A1* | 10/2008 | Mukherjee et al. | 370/338 |
| 2010/0067471 A1* | 3/2010 | Matsuzawa | 370/329 |

FOREIGN PATENT DOCUMENTS

| | | |
|---|---|---|
| JP | 2007 36828 | 2/2007 |
| JP | 2007 274092 | 10/2007 |

OTHER PUBLICATIONS

International Search Report issued Jun. 30, 2009 in PCT/JP09/060389 filed Jun. 5, 2009.

* cited by examiner

| GROUP ID | MARGIN | TRANSMISSION RATE | LAN CAPACITY | RADIO BASE STATION ID | NUMBER OF SIMULTANEOUSLY-CONNECTABLE MOBILE STATIONS |
|---|---|---|---|---|---|
| 1 | 2Mbps | 2Mbps | 10Mbps | 200 | 4 |
| | | | | 201 | |
| 2 | 50Mbps | 2Mbps | 100Mbps | 202 | 25 |
| | | | | 203 | |
| | | | | 204 | |
| | | | | 205 | |
| | | | | 206 | |
| .. | .. | .. | .. | .. | .. | ts of the page:

MOBILE COMMUNICATION METHOD AND NETWORK APPARATUS

TECHNICAL FIELD

The present invention relates to a mobile communication method and a network apparatus.

BACKGROUND ART

Generally, in a mobile communication system, a radio base station for public communication operates as follows so as to meet the service quality required in each of communications occurring at random.

(1) Use a private line for a line between each public-communication radio base station and a mobile communication carrier network, and design a transmission band of the exclusive line based on the amount of traffic expected in the public-communication radio base station.

(2) Unify priority policies for data flowing to the mobile communication carrier networks, and allocate the priority according to the service quality required by each communication.

On the other hand, in a possible case of a radio base station called a home radio base station (a Home eNB) and installed in a small area such as a house, the home radio base station is operated by being connected to a user network (a user LAN: Local Area Network) established at the end of a general access line, such as FTTH or ADSL, to which a user subscribes.

SUMMARY OF INVENTION

However, the transmission band of the user LAN managed by a user is not designed based on the amount of traffic expected in the installed home radio base station. Accordingly, if admission control is performed based on the number of simultaneously-connectable mobile stations set for each home radio base station on the user LAN, traffic exceeding the transmission band of the user LAN might flow from multiple home radio base stations, causing data to be discarded.

Accordingly, the present invention has been made in consideration of the above problem, and has an objective to provide a mobile communication method and a network apparatus which are capable of preventing occurrence of excessively much traffic and data discard in a user LAN, by performing admission control appropriately in a home radio base station connected to the user LAN.

A first aspect of the present invention is summarized as a mobile communication method comprise step A of finding a different radio base station already installed in a specific user network when a first radio base station is installed in the specific user network; step B of forming a group including the first radio base station and the different radio base station found by the first radio base station; step C of determining a number of simultaneously-connectable mobile stations for the group thus formed; and step D of restricting a number of mobile stations simultaneously connected to the first radio base station and the different radio base station which belong to the group, based on the number of simultaneously-connectable mobile stations determined for the group.

In the first aspect, wherein, in the step A, the first radio base station broadcasts self information to the user network, the different radio base station sends a response signal to the self information thus received, and the first radio base station finds the different radio base station based on the response signal thus received.

In the first aspect, wherein, in the step A, the first radio base station uses a UPnP (Universal Plug & Play) function to find the different radio base station.

In the first aspect, wherein, in the step C, the number of simultaneously-connectable mobile stations is determined based on a maximum transmission band of the user network and on a radio transmission rate between a mobile station and each of the first radio base station and the different radio base station so that a total sum of the radio transmission rates does not exceed a certain percentage of the maximum transmission band.

In the first aspect, wherein in the step B a network apparatus forms the group, in the step C the network apparatus determines the number of simultaneously-connectable mobile stations, and in the step D the network apparatus restricts a number of mobile stations simultaneously connected to the first radio base station and the different radio base station which belong to the group, based on the number of simultaneously-connectable mobile stations.

In the first aspect, wherein in the step B the first radio base station and the different radio base station form the group, in the step C the first radio base station and the different radio base station each determine the number of simultaneously-connectable mobile stations, and in the step D the first radio base station and the different radio base station each restrict a number of mobile stations simultaneously connected thereto, based on the number of simultaneously-connectable mobile stations.

A second aspect of the present invention is summarized as a network apparatus comprising a radio-base-station information receiving unit configured to receive, from a first radio base station newly installed in a specific user network, information on a different radio base station installed on the specific user network, a group forming unit configured to form a group including the first radio base station and the different radio base station which has been indicated by the information on the different radio base station received from the first radio base station, a determining unit configured to determine a number of simultaneously-connectable mobile stations for the group thus formed, and an admission control unit configured to restrict a number of mobile stations connected to the first radio base station and the different radio base station which belong to the group, based on the number of simultaneously-connectable mobile stations determined for the group.

In the second aspect, wherein the determining unit determines the number of simultaneously-connectable mobile stations based on a maximum transmission band of the user network and on a radio transmission rate between a mobile station and each of the first radio base station and the different radio base station so that a total sum of the radio transmission rates does not exceed a certain percentage of the maximum transmission band.

As described above, according to the present invention, it is possible to provide a mobile communication method and a network apparatus which are capable of preventing occurrence of excessively much traffic and data discard in a user LAN, by performing admission control appropriately in a home radio base station connected to the user LAN.

DESCRIPTION OF EMBODIMENT

Figure 1:
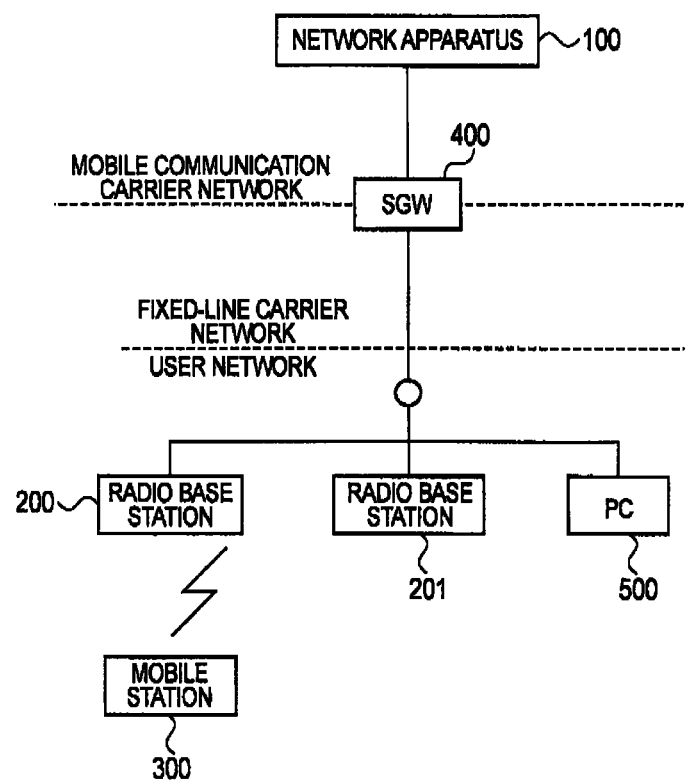
FIG. 1 is a diagram showing the overall configuration of a mobile communication system according to a first embodiment of the present invention.
Figures 2, 3:
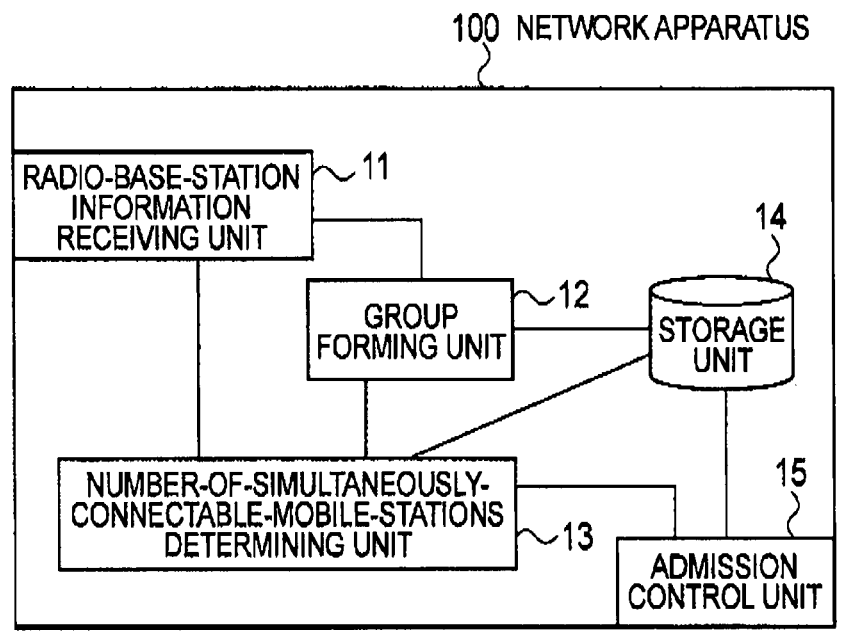
FIG. 2 is a functional block of radio network controller according to the first embodiment of the present invention.
FIG. 3 is a diagram showing an example of group information stored in the radio network controller according to the first embodiment of the present invention.

Configuration of Mobile Communication System according to First Embodiment of Present Invention With reference to FIGS. 1 through 3, the configuration of a mobile communication system according to a first embodiment of the present invention is described.

As shown in FIG. 1, the mobile communication system according to the present embodiment includes a network apparatus 100, a security gateway (SGW) 400, and radio base stations 200 and 201.

Here, the radio base stations 200 and 201 are housed in the network apparatus 100. Further, the network apparatus 100 is configured to allocate operation parameters to the radio base stations 200 and 201. The operation parameters are used in radio communication between a mobile station 300 and each of the radio base stations 200 and 201. The network apparatus 100 is also configured to perform control of admitting a communication between the mobile station 300 and the radio base station 200 or 201.

Here, if the mobile communication system according to the present embodiment is a mobile communication system using a W-CDMA scheme, functions of the network apparatus 100 are provided to a radio network controller RNC.

Note that the radio base stations 200 and 201 are each a home radio base station under the management of a user subscribing to a communication service provided by a network administrator (a mobile communication operator).

For example, the radio base stations 200 and 201 are installed on a user LAN (a user network) managed by the above-mentioned user, and is connected to the network apparatus 100 on a mobile communication carrier network via a carrier network for FTTH or ADSL access (a fixed-line carrier network).

In this case, in a user LAN in a house which a mobile communication carrier cannot control, there might occur a case where Internet traffic from a PC 600 and traffic through the radio base stations 200 and 201 are superimposed on each other.

The SGW 400, on the other hand, is installed on a border of the mobile communication carrier network. The SGW 400 is a gateway apparatus for protecting the mobile communication carrier network from unauthorized access from other networks, and is configured to pass only accesses authenticated through authentication procedures to the mobile communication carrier network.

As shown in FIG. 2, the network apparatus 100 includes a radio-base-station information receiving unit 11, a group forming unit 12, a number-of-simultaneously-connectable-mobile-stations determining unit 13, a storage unit 14, and an admission control unit 15.

The radio-base-station information receiving unit 11 is configured to receive radio-base-station information from a first radio base station newly installed on a specific user network (such as a user LAN/WAN). The radio-base-station information indicates information on a different radio base station already installed on the specific user network.

Here, the radio-base-station information receiving unit 11 may be configured to receive a maximum transmission band (a LAN capacity) of the above-mentioned specific user network, along with the above-mentioned radio-base-station information.

The group forming unit 12 is configured to form a group including the first radio base station and the different radio base station indicated by the radio-base-station information (information on the different radio base station) received from the first radio base station.

For example, the group forming unit 12 is configured to form a group including the radio base station 201 (the first radio base station) and the radio base station 200 (the different-radio base station) which is indicated by the radio-base-station information received from the radio base station 201 (the first radio base station).

The number-of-simultaneously-connectable-mobile-stations determining unit 13 is configured to determine the number of simultaneously-connectable mobile stations for the group formed of the radio base station 201 (the first radio bases station) and the radio base station 200 (the different radio base station).

For example, the number-of-simultaneously-connectable-mobile-stations determining unit 13 is configured to determine the number of simultaneously-connectable mobile stations based on the maximum transmission band of the user network of the group and on a radio transmission rate between the mobile station and each of the radio base stations belonging to the group (the first radio base stations and the different radio base station). Specifically, the number of simultaneously-connectable mobile stations is determined so that the total sum of the radio transmission rates would not exceed a certain percentage of the maximum transmission band.

As shown in FIG. 3, the storage unit 14 is configured to store therein group information in which, for example, a "group ID," a "margin," a "transmission rate," a "LAN capacity," a "radio base station ID," and a "number of simultaneously-connectable mobile stations" are associated with one another.

Here, the "group ID" is an identifier identifying a group. The "margin" is a value provided for the maximum transmission band (the LAN capacity) of the user network in consideration that traffic that occurs in the specific user network include not only the traffic occurring in the home radio base station, but also the Internet traffic occurring from a PC of the user, or the like. The "margin" is used in calculating the "number of simultaneously-connectable mobile stations" to be described later.

The "transmission rate" is a radio transmission rate between the mobile station 300 and a corresponding one of the radio base stations belonging to the group (the first radio base station and the different radio base station). The "LAN capacity" is a maximum transmission band of the user network of the corresponding group ID.

The "radio base station ID" is information identifying each of the radio base stations belonging to the group (the first radio base station and the different radio base station). Specifically, information on all the radio base stations belonging to the group and being set in the "radio base station ID" is notified of by the group forming unit 12.

The "number of simultaneously-connectable mobile station" is the number of simultaneously-connectable mobile stations determined for the group. Specifically, the number of simultaneously-connectable mobile stations set in the "number of simultaneously-connectable mobile stations" is notified of by the number-of-simultaneously-connectable-mobile-stations determining unit 13.

In the example shown in FIG. 3, for a group #1 to which the radio base stations 200 and 201 belong, the maximum transmission band (the LAN capacity) of the user network to which the radio base stations 200 and 201 are connected is "10 Mbps," the radio transmission rate between the mobile station 300 and each of the radio base stations 200 and 201 is "2 Mbps," and the margin for the Internet traffic or the like is "2 Mbps." Accordingly, the radio base stations 200 and 201 can have up to 8 Mbps of the transmission band of the user network, and therefore the number of simultaneously-connectable mobile stations is "4."

Specifically, the number-of-simultaneously-connectable-mobile-stations determining unit 13 calculates "4" for the number of simultaneously-connectable mobile stations by dividing "8 Mbps," which is obtained by subtracting the margin (i.e., "2 Mbps") from the maximum transmission band (the LAN capacity) (i.e., 10 Mbps) of the user network to which the radio base stations 200 and 201 are connected, by the radio transmission rate between the mobile station 300 and each of the radio base stations 200 and 201 (i.e., "2 Mbps").

In other words, the number-of-simultaneously-connectable-mobile-stations determining unit 13 is configured to determine the number of simultaneously-connectable mobile stations so that the above-mentioned total sum of the radio transmission rates ("2 Mbps (the transmission rate)"×"4 (the number of simultaneously-connectable mobile stations)") would not exceed a certain percentage of the maximum transmission band ("10 Mbps (the LAN capacity)"−"2 Mbps (the margin)").

Further, in the example shown in FIG. 3, for a group #2 to which radio base stations 202 to 206 belong, the maximum transmission band (the LAN capacity) of the user network to which the radio base stations 202 to 206 are connected is "100 Mbps," the radio transmission rate between the mobile station 300 and each of the radio base stations 202 to 206 is "2 Mbps," and the margin for the Internet traffic or the like is "50 Mbps." Accordingly, the radio base stations 202 to 206 can have up to 50 Mbps of the transmission band of the user network, and therefore the number of simultaneously-connectable mobile stations is "25."

Specifically, the number-of-simultaneously-connectable-mobile-stations determining unit 13 calculates "25" for the number of simultaneously-connectable mobile stations by dividing "50 Mbps," which is obtained by subtracting the margin (i.e., "50 Mbps") from the maximum transmission band (the LAN capacity) (i.e., 100 Mbps) of the user network to which the radio base stations 202 to 206 are connected, by the radio transmission rate between the mobile station 300 and each of the radio base stations 202 to 206 (i.e., "2 Mbps").

In other words, the number-of-simultaneously-connectable-mobile-stations determining unit 13 is configured to determine the number of simultaneously-connectable mobile stations so that the above-mentioned total sum of the radio transmission rates ("2 Mbps (the transmission rate)"×"25 (the number of simultaneously-connectable mobile stations)") would not exceed a certain percentage of the maximum transmission band ("100 Mbps (the LAN capacity)"−"50 Mbps (the margin)").

The admission control unit 15 is configured to perform admission control on the radio base stations belonging to the group based on the number of simultaneously-connectable mobile stations determined for the group, and thereby to restrict the number of simultaneously-connected mobile stations to the first radio base station and the different radio base station which belong to the group.

In the example shown in FIG. 3, the admission control unit 15 performs the admission control so that the number of mobile stations simultaneously connected to the radio base stations 200 and 201 belonging to the group #1 may be 4 at the maximum, and performs the admission control so that the number of mobile stations simultaneously connected to the radio base stations 202 to 206 belonging to the group #2 may be 25 at the maximum.

Figure 4:
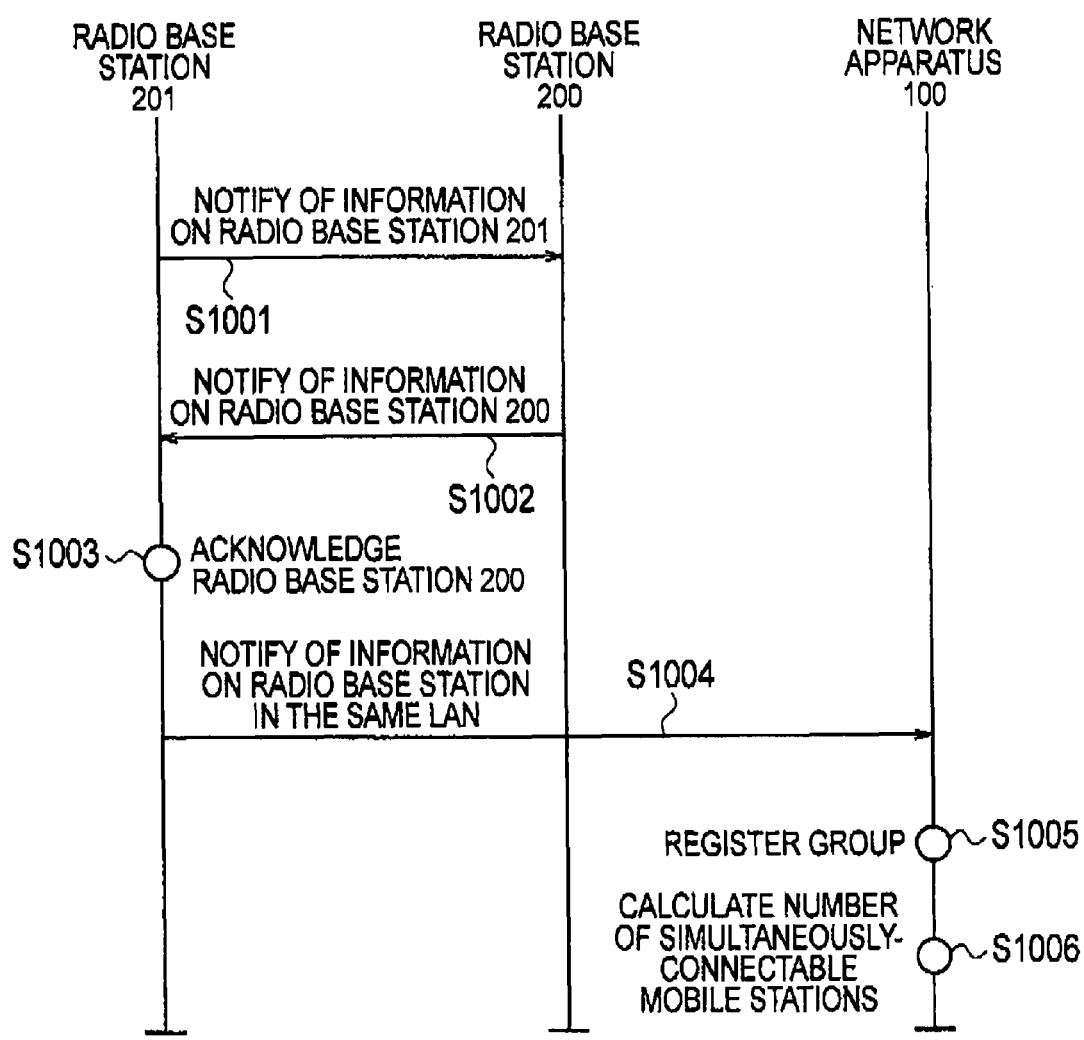
FIG. 4 is a sequence diagram showing operations of the mobile communication system according to the first embodiment of the present invention.

Operations of Mobile Communication System According to First Embodiment of Present Invention With reference to FIG. 4, a description is given of the operations of the mobile communication system according to the first embodiment of the present invention, or specifically, the operations performed when the radio base station 201 (the first radio base station) is newly installed in a user LAN while the radio base station 200 (the different radio station) is operating in that user LAN.

As shown in FIG. 4, when the radio base station 201 is newly installed on a user LAN, in Step S1000, the radio base station 201 multicasts (broadcasts) self information on the user LAN, the self information indicating the presence of the radio base station 201 itself. All the devices connected on the user LAN are notified of the self information.

In Step S1002, the radio base station 200 discovers that the radio base station 201 has newly installed on the user LAN by receiving the self information, and notifies the radio base station 201 of a response signal to the self information received.

In Step S1003, upon receipt of the response signal, the radio base station 201 finds the radio base station 200 installed in the user LAN. In Step S1004, the radio base station 201 notifies the network apparatus 100 of information on the radio base station 200 installed on the user LAN.

Note that the radio base station 201 may use a UPnP (Universal Plug & Play) function to find the radio base station 200 installed on the user LAN.

In Step S1005, the network apparatus 100 forms a group including the radio base station 200 and the radio base station 201 since the radio base station 200 and the radio base station 201 are installed on the same user LAN, and registers the group.

In Step S1006, the network apparatus 100 determines the number of mobile stations simultaneously connectable to the radio base station 200 and the radio base station 201 belonging to the group formed in Step S1005 (i.e., the number of simultaneously-connectable mobile stations) in consideration of the maximum transmission band of the user LAN.

For example, in the network apparatus 100, information on the maximum transmission band of the user LAN corresponding to the group is stored in a database.

Note that the maximum transmission band of the user LAN may be notified of by the radio base station 201 installed on the user LAN, or may be registered by a user when the user purchases or subscribes to the radio base station 200 or 201.

Advantageous Effects of Mobile Communication System According to First Embodiment of Present Invention With the mobile communication system according to the first embodiment of the present invention, the number of simultaneously-connectable mobile stations can be set appropriately for each group in consideration of all devices (such as radio base stations and PCs) connected to the user LAN corresponding to the group. Accordingly, it is prevented that too much traffic occurs on the user LAN and that data is discarded.

(Modifications)

The embodiment has been described above, taking a mobile communication system using a W-CDMA scheme as an example, but the present invention is not restricted to such a mobile communication system. For example, the present invention is applicable to a mobile communication system using an LTE (Long Term Evolution) scheme.

Here, if the mobile communication system according to the present embodiment is the mobile communication system using the LTE scheme, at least part of the functions of the network apparatus 100 shown in FIG. 2 may be provided to each of the radio base stations 200, 201.

In other words, in the mobile communication system according to this modification, the network apparatus 100 does not exist, and the radio base station 200 and the radio base station 201 are configured to exchange control signals.

Specifically, the radio base station 200 and the radio base station 201 are configured to form a group including all the radio base stations existing on the same user LAN.

In addition, the radio base station 200 and the radio base station 201 are each configured to determine its own number of simultaneously-connectable mobile stations.

The radio base station 200 and the radio base station 201 are configured to then determine the number of simultaneously-connectable mobile stations for the group, by exchanging information on their respective numbers of simultaneously-connectable mobile stations.

Here, the radio base station 200 and the radio base station 201 may determine the number of simultaneously-connectable mobile stations based on the maximum transmission band of the user LAN and on the radio transmission rate between the mobile station and each of the radio base station 200 and the radio base station 201 so that the total sum of the radio transmission rates would not exceed a certain percentage of the maximum transmission band.

Further, the radio base station 200 and the radio base station 201 are each configured to restrict the number of mobile stations simultaneously connected thereto based on the number of simultaneously-connectable mobile stations thus determined.

Note that, in the mobile communication system using the LTE scheme, part of the functions of the network apparatus 100 shown in FIG. 2 may be provided to a radio base station representative of all the radio base stations existing on the same user LAN, or may be provided to an exchange station MME.

Note that, if the mobile communication system according to the present embodiment is the mobile communication system using the LTE scheme, and if a concentrator HNB-GW housing the radio base stations 200, 201 is provided, part of the functions of the network apparatus 100 shown in FIG. 2 may be provided to the concentrator HNB-GW.

Further, if the mobile communication system according to the present embodiment is the mobile communication system using the W-CDMA scheme, and if the concentrator HNB-GW housing the radio base stations 200, 201 is provided, part of the functions of the network apparatus 100 shown in FIG. 3 may be provided to the concentrator HNB-GW.

Moreover, if the mobile communication system according to the present embodiment is the mobile communication system using the W-CDMA scheme, part of the functions of the network apparatus 100 shown in FIG. 3 may be provided to an exchange station MSC/SGSN.

Note that operation of the above described the radio base stations 200, 201 and the network apparatus 100 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base stations 200, 201 and the network apparatus 100. Also, the storage medium and the processor may be provided in the radio base stations 200, 201 and the network apparatus 100 as a discrete component.

Hereinabove, the present invention has been described in detail using the above embodiment; however, it is apparent to those skilled in the art that the present invention is not restricted to the embodiment described herein. Modifications and variations of the present invention can be made without departing from the spirit and scope of the present invention defined by the description of the scope of claims. Thus, what is described herein is for illustrative purpose, and has no intention whatsoever to restrict the present invention.

The invention claimed is:

1. A mobile communication method comprising:
finding a different radio base station already installed in a specific user network when a first radio base station is installed in the specific user network, the specific user network being a local area network (LAN);
forming a group including the first radio base station and the different radio base station found by the first radio base station;
determining a number of simultaneously-connectable mobile stations for the group by a network apparatus in a mobile communication carrier network, the network apparatus not being part of the user network; and
restricting, by processing circuitry, a number of mobile stations simultaneously connected to the first radio base station and the different radio base station which belong to the group, based on the number of simultaneously-connectable mobile stations determined for the group,
wherein, in the determining, the number of simultaneously-connectable mobile stations is determined based on a maximum transmission band of the user network and on a radio transmission rate between a mobile station and each of the first radio base station and the different radio base station so that a total sum of the radio transmission rates does not exceed a certain percentage of the maximum transmission band, and
the number of simultaneously-connectable mobile stations corresponds to a maximum number of mobile stations connectable to the group.

2. The mobile communication method according to claim 1, wherein, in the finding,
the first radio base station broadcasts self information to the user network,
the different radio base station sends a response signal to the self information thus received, and
the first radio base station finds the different radio base station based on the response signal thus received.

3. The mobile communication method according to claim 1, wherein, in the finding, the first radio base station uses a UPnP (Universal Plug & Play) function to find the different radio base station.

4. The mobile communication method according to claim 1, wherein
in the forming, a network apparatus forms the group,
in the determining, the network apparatus determines the number of simultaneously-connectable mobile stations, and
in the restricting, the network apparatus restricts a number of mobile stations simultaneously connected to the first radio base station and the different radio base station which belong to the group, based on the number of simultaneously-connectable mobile stations.

5. The mobile communication method according to claim 1, wherein
in the forming, the first radio base station and the different radio base station form the group,
in the determining, the first radio base station and the different radio base station each determine the number of simultaneously-connectable mobile stations, and
in the restricting, the first radio base station and the different radio base station each restrict a number of mobile stations simultaneously connected thereto, based on the number of simultaneously-connectable mobile stations.

6. The mobile communication method according to claim 1, wherein the network apparatus in the mobile communication carrier network performs the restricting.

7. The mobile communication method according to claim 1, wherein the number of simultaneously-connectable mobile stations is based on a maximum transmission band of the specific user network of the group and a radio transmission rate between a mobile station and each of the first radio base station and the different radio base station.

8. The mobile communication method according to claim 1, wherein the restricting is performed by the network apparatus in the mobile communication carrier network.

9. The mobile communication method according to claim 1, wherein the number of simultaneously-connectable mobile stations is a maximum number of simultaneous-connectable mobile stations.

10. A network apparatus comprising:
circuitry configured to:
receive, from a first radio base station newly installed in a specific user network, information on a different radio base station installed on the specific user network, the specific user network being a local area network (LAN);
form a group including the first radio base station and the different radio base station which has been indicated by the information on the different radio base station received from the first radio base station;
determine a number of simultaneously-connectable mobile stations for the group by a network apparatus in a mobile communication carrier network, the network apparatus not being part of the user network; and
restrict a number of mobile stations connected to the first radio base station and the different radio base station which belong to the group, based on the number of simultaneously-connectable mobile stations determined for the group,
wherein the number of simultaneously-connectable mobile stations is determined based on a maximum transmission band of the user network and on a radio transmission rate between a mobile station and each of the first radio base station and the different radio base station so that a total sum of the radio transmission rates does not exceed a certain percentage of the maximum transmission band, and
the number of simultaneously-connectable mobile stations corresponds to a maximum number of mobile stations connectable to the group.

* * * * *